United States Patent
Concas

(10) Patent No.: US 12,351,173 B2
(45) Date of Patent: **\*Jul. 8, 2025**

(54) EHC WARMUP NOTIFICATION

(71) Applicant: TOYOTA MOTOR ENGINEERING & MANUFACTURING NORTH AMERICA, INC., Plano, TX (US)

(72) Inventor: Alessandro Concas, Redondo Beach, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,813

(22) Filed: Mar. 1, 2024

(65) Prior Publication Data

US 2024/0199019 A1    Jun. 20, 2024

Related U.S. Application Data

(63) Continuation of application No. 17/320,793, filed on May 14, 2021, now Pat. No. 11,951,986.

(51) Int. Cl.
| | |
|---|---|
| *B60W 30/18* | (2012.01) |
| *B60W 40/12* | (2012.01) |
| *B60W 50/12* | (2012.01) |
| *B60W 50/14* | (2020.01) |

(52) U.S. Cl.
CPC .......... *B60W 30/18* (2013.01); *B60W 40/12* (2013.01); *B60W 50/12* (2013.01); *B60W 50/14* (2013.01); *B60W 2050/146* (2013.01); *B60W 2420/00* (2013.01)

(58) Field of Classification Search
CPC ...... B60W 30/18; B60W 40/12; B60W 50/12; B60W 50/14; B60W 2050/146; B60W 2420/00; B60W 50/10; B60W 2050/143; B60W 2530/12; Y02A 50/20
See application file for complete search history.

(56) References Cited

U.S. PATENT DOCUMENTS

| | | | | |
|---|---|---|---|---|
| 5,555,725 | A | * | 9/1996 | Shimasaki .............. F01N 11/00 219/202 |
| 11,879,376 | B2 | * | 1/2024 | Boiarciuc ............. F01N 3/2013 |
| 2004/0111199 | A1 | * | 6/2004 | Javaherian ............ F02D 41/064 701/2 |
| 2018/0126986 | A1 | * | 5/2018 | Kim .................... B60W 30/146 |
| 2018/0187585 | A1 | * | 7/2018 | Crawford ................. F01N 9/00 |

(Continued)

*Primary Examiner* — Jason Holloway
*Assistant Examiner* — Madison B Emmett
(74) *Attorney, Agent, or Firm* — SHEPPARD, MULLIN, RICHTER & HAMPTON LLP; Daniel N. Yannuzzi

(57) ABSTRACT

Systems and methods of electrically heating catalyst (EHC) driver notification are provided. With the goal of increasing driver cooperation in reducing emissions, EHC driver notification systems notify the driver when the EHC is in an inefficient operation state. This notification is provided to the driver so that the driver may consciously operate the vehicle in a fashion that reduces emissions while the EHC is in the inefficient operation state. EHC driver notifications systems may also restrict operation of the vehicle when the EHC is in an inefficient operation state. However, for safety reasons, these systems provide the driver a function to bypass the restriction as needed.

20 Claims, 7 Drawing Sheets

(56) References Cited

U.S. PATENT DOCUMENTS

| | | | |
|---|---|---|---|
| 2021/0189936 A1* | 6/2021 | Korenaga | F01N 9/00 |
| 2022/0010742 A1* | 1/2022 | Cox | F02N 11/0829 |
| 2023/0042626 A1* | 2/2023 | Kitaura | F02D 41/024 |

* cited by examiner

EHC WARMUP NOTIFICATION

CROSS-REFERENCE TO RELATED APPLICATIONS

This application is a continuation of and claims the benefit of U.S. patent application Ser. No. 17/320,793 filed on May 14, 2021, which is hereby incorporated herein by reference in its entirety for all purposes.

TECHNICAL FIELD

The present disclosure relates generally to automotive systems and technologies, and more particularly, some embodiments relate to providing a driver with information related to the operation of an electrically heated catalyst in a vehicle.

DESCRIPTION OF RELATED ART

Catalytic converters are known in the art to help reduce emissions produced by internal combustion engines. Specifically, catalytic converters have been widely used in vehicles to remove harmful substances such as HC (hydrocarbons), NOx (nitrogen oxides), and CO (carbon monoxide) from the exhaust stream. However, it is known that the catalysts used in catalytic converters do not operate efficiently at low temperatures. More specifically, before a catalyst reaches its "light-off temperature" (an industry term that can refer to the temperature or range of temperatures at which the catalytic reactions in the converter initiate and the catalytic reaction rate increases exponentially), it removes the aforementioned pollutants at less than 50% efficiency. This is problematic during and immediately after cold start of an internal combustion engine, where it takes exhaust gases a period of time to heat the catalyst to its light-off temperature. This cold starting problem is particularly acute during the operation of plug-in hybrid vehicles because these vehicles operate for long periods with the internal combustion engine off. In addition, during the operation of plug-in hybrid vehicles, issues arise when the internal combustion engine is cold started because the driver makes a high load demand that the electric motor cannot meet (for example, passing a slower driver in the passing lane). This situation produces especially high concentration emissions as the sudden high load demand on the internal combustion engine produces more pollutant dense exhaust than is typical when starting the internal combustion engine of a parked vehicle.

One known solution to the cold starting problem is the electrically heated catalyst ("EHC"). EHCs are catalytic converters adapted to be heated by electrical energization. For example, some EHCs may be adapted to be heated by electrical resistance heaters. Vehicle batteries may be used to energize these heaters prior to engine start up, and the engine alternator (or in hybrid vehicles, the electric motor), may be used to energize the heaters after engine start up. However, the EHC is not an infallible solution. More specifically, in certain situations a vehicle's EHC will not be completely pre-heated to its light-off temperature prior to cold start of the internal combustion engine. In these situations, the internal combustion of engine will produce harmful emissions that are not efficiently removed by the EHC until the EHC reaches its light-off temperature.

BRIEF SUMMARY OF THE DISCLOSURE

According to various embodiments of the disclosed technology, a method for restricting acceleration of a vehicle in response to an operational state of an electrically heated catalyst (EHC) in the vehicle, is provided. The method, in accordance with embodiments of the technology disclosed herein may comprise: (1) comparing data associated with an EHC in a vehicle with corresponding threshold value data; and (2) based on the comparison, impeding travel range of an accelerator pedal of the vehicle to restrict acceleration of the vehicle. In some embodiments, the data associated with the EHC may comprise data associated with a current operational state of the EHC. In certain embodiments, the data associated with the EHC may comprise a temperature of the EHC and the comparison between the data associated with the EHC and the corresponding threshold value data comprises a comparison between the temperature of the EHC and a threshold EHC temperature. In various embodiments, the data associated with the EHC may comprise a total electric energy supplied to the EHC and the comparison between the data associated with the EHC and the corresponding threshold value data may comprise a comparison between the total electric energy supplied to the EHC and a threshold electric energy. In some embodiments, the method may further comprise providing EHC-relevant display content based on the comparison. In some of these embodiments, the EHC-relevant display content may comprise an audio-visual comparison between a threshold EHC temperature and a temperature of the EHC as it fluctuates based on driving state of the vehicle. In other embodiments, the EHC-relevant display content may comprise an indicator light which indicates whether temperature of the EHC exceeds a threshold EHC temperature. In certain of these embodiments, the EHC-relevant display content may only further comprise an audio-visual comparison between the threshold EHC temperature and the temperature of the EHC as it fluctuates based on the driving state of the vehicle, when the temperature of the EHC is less than the threshold EHC temperature.

In various embodiments, a method for restricting acceleration of a vehicle based on an amount of time it will take an EHC in the vehicle to heat to a corresponding threshold EHC temperature, is provided. The method, in accordance with embodiments of the technology disclosed herein may comprise: (1) determining an amount of time it will take an electrically heated catalyst (EHC) in a vehicle to heat to a corresponding threshold EHC temperature; and (2) based on the amount of time it will take the EHC to heat to the corresponding threshold EHC temperature, restricting acceleration of the vehicle during operation of an internal combustion engine in the vehicle. In some embodiments, the method may further comprise providing EHC-relevant display content based on the amount of time it will take the EHC to heat to the corresponding threshold EHC temperature. In such embodiments, the EHC-relevant display content may comprise a countdown clock representing the time it will take the EHC to heat to the threshold EHC temperature.

In certain embodiments, a vehicle is provided. The vehicle may comprise: (1) an accelerator pedal; (2) an EHC; (3) non-transitory memory configured to store instructions; and (4) one or processors configured to execute the instructions to: (a) compare data associated with a current operational state of the EHC with corresponding threshold value data; and (b) impede travel range of the accelerator pedal to restrict acceleration of the vehicle. In some embodiments, the one or processors may be further configured to execute the instructions to provide a bypass function to bypass the acceleration restriction. In certain of these embodiments, the bypass function may comprise a driver initiated control signal. In some of these embodiments, the bypass function may allow a driver of the vehicle to bypass the acceleration restriction by applying pressure on the accelerator pedal. In various embodiments, the one or processors may be further configured to execute the instructions to restrict operation of heaters in the vehicle based on the comparison. In some embodiments, the data associated with the current operational state of the EHC may comprise a temperature of the EHC. In these embodiments, (i) the comparison between the data associated with the current operational state of an EHC and its corresponding threshold value data may comprise a comparison between the temperature of the EHC and a threshold EHC temperature, and (ii) the acceleration restriction may be implemented when the temperature of the EHC is below the threshold EHC temperature. In various embodiments, the data associated with the current operational state of the EHC may comprise a total electric energy supplied to the EHC. In these embodiments, (i) the comparison between the data associated with the current operational state of an EHC and its corresponding threshold value data may comprise a comparison between the total electric energy supplied to the EHC and a threshold electric energy and, (ii) the acceleration restriction may be implemented when the total electric energy supplied to the EHC is below the threshold electric energy. In certain embodiments, the data associated with the current operational state of the EHC may comprise a temperature of the EHC and a level of emissions detected downstream of the EHC. In these embodiments, (i) the comparison between the data associated with the current operational state of the EHC and its corresponding threshold value data may comprise a first comparison between the temperature of the EHC and a threshold EHC temperature and a second comparison between the level of emissions detected downstream of the EHC and a threshold emissions level, and (ii) the acceleration restriction may be implemented when the temperature of the EHC is below the threshold EHC temperature and the level of emissions detected downstream of the EHC is above the threshold emissions level. In various embodiments, the data associated with the current operational state of the EHC may comprise a temperature of the EHC and a total electric energy supplied to the EHC. In these embodiments, (i) the comparison between the data associated with the current operational state of the EHC and its corresponding threshold value data may comprise a first comparison between the temperature of the EHC and a threshold EHC temperature and a second comparison between the total electric energy supplied to the EHC and a threshold electric energy, and (ii) the acceleration restriction may be implemented when the temperature of the EHC is less than the threshold EHC temperature and the total electric energy supplied to the EHC is less than the threshold electric energy.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As alluded to above, situations may arise where a load demand occurs/is received before an EHC has reached its light-off temperature, during which harmful emissions can still be produced by a vehicle's internal combustion engine. Thus, while the EHC may be an improvement over the traditional catalytic converter, there are ways to achieve greater EHC efficiency that have yet to be taken advantage of. Accordingly, embodiments of the technology disclosed herein are directed towards systems and methods for providing a driver with (1) a notification related to the operation of an EHC in a vehicle, and (2) a function to bypass a vehicle operation holdback function implemented because the EHC is in an inefficient operating state (i.e. anytime EHC energization is incomplete). Incomplete energization can refer to a state/condition whereby the catalyst cannot achieve the target temperature prior to the engine starting. That is, various embodiments can provide EHC assistance during vehicle operation at times when the EHC may not be operating at full efficiency.

In some embodiments, a driver can be notified when an EHC is in an inefficient operating state (e.g. the EHC is still heating prior to reaching its light-off temperature). Such a notification can be issued so that the driver may consciously refrain from operating the vehicle in a way that produces high emissions (e.g. refraining from aggressive driving). As noted above, when the EHC is not operating at full efficiency certain holdback functions (e.g. restricting acceleration) may be applied in order to limit the combustion gases produced during this period. In some embodiments, the driver may be allowed to bypass these restrictions, as under certain conditions they may be inappropriate (e.g. when the driver is merging onto a highway). Various embodiments affect driver behavior, and ultimately facilitate driver cooperation in reducing emissions by making the operation of the EHC more transparent.

Figure 1A:
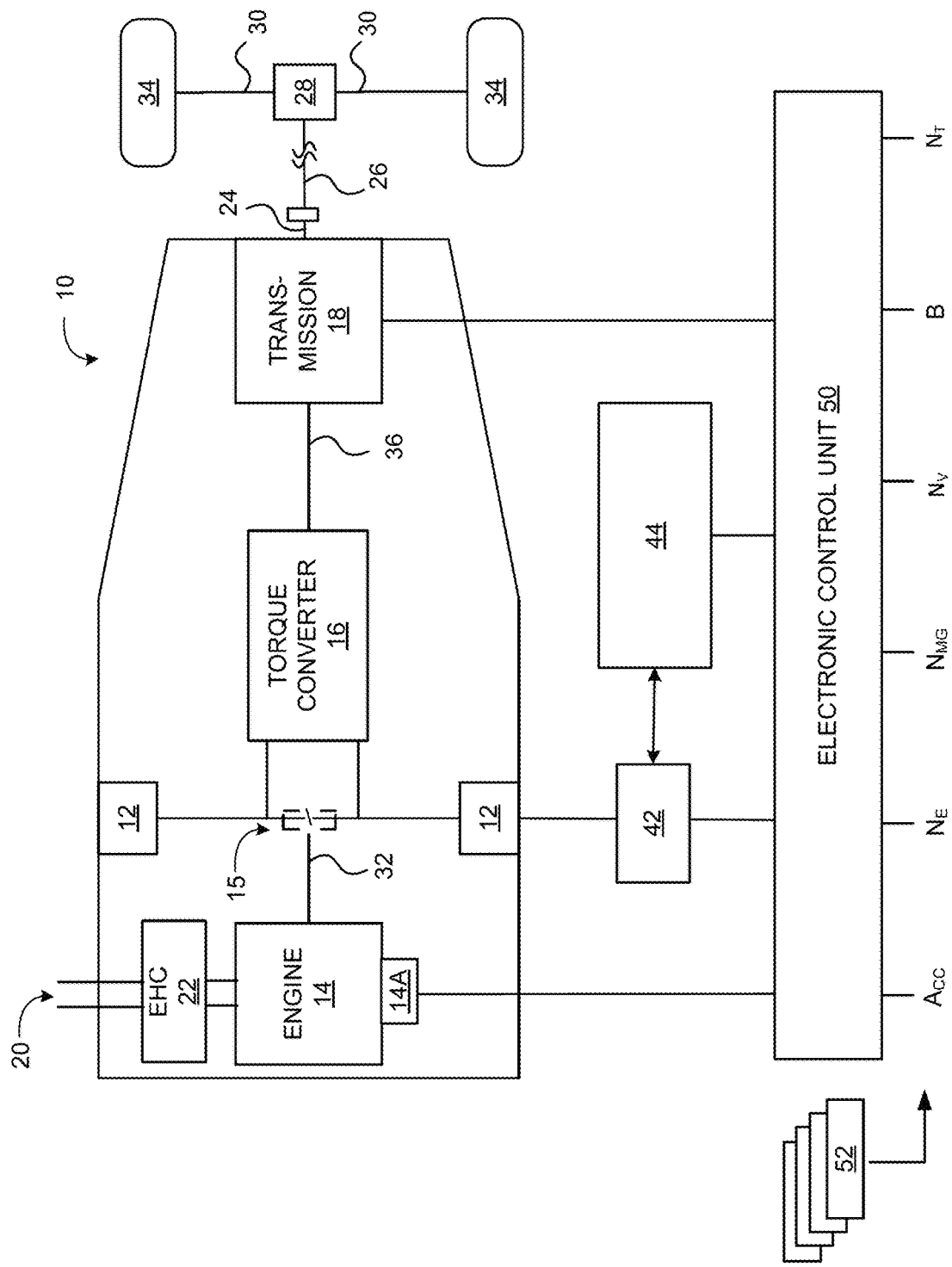
FIG. 1A illustrates an example of a vehicle with which systems and methods for EHC notification and holdback can be implemented in accordance with one embodiment of the present disclosure.

FIG. 1A illustrates a drive system of a hybrid electric vehicle 10 that includes an EHC 22. The system may include an internal combustion engine 14 and one or more electric motors 12 as sources of motive power. The exhaust gases generated by internal combustion engine 14 pass through the exhaust passage 20.

EHC 22 is located along exhaust passage 20. EHC 22 is equipped with a catalyst capable of purifying harmful substances in the exhaust stream such as NOx, CO and the like. EHC 22 is also equipped with one or more electric resistance heaters capable of being energized by an electric power source, such as power storage device 44 (to be described in greater detail below). In some embodiments, EHC 22 may be equipped with a temperature sensor for detecting the temperature of EHC 22. In certain embodiments, EHC 22 may be equipped with other sensors, for example, sensors for detecting the current supplied to EHC 22, and the voltage across EHC 22 (as will be discussed below, signals from these sensors may be used to calculate a total electric energy supplied to the EHC). In addition, in some embodiments, sensors for detecting emissions may be located in exhaust passage 20, both upstream, and downstream of EHC 22. All of these sensors may be included in the plurality of sensors 52 (to be described in greater detail below).

As discussed above, the drive system of vehicle 10 may include internal combustion engine 14 and one or more electric motors 12 as sources of motive power. Driving force generated by internal combustion engine 14 and motor 12 can be transmitted to one or more wheels 34 via a torque converter 16, a transmission 18, a differential gear device 28, and a pair of axles 30.

As an HEV, vehicle 10 may be driven/powered with either or both of internal combustion engine 14 and the motor(s) 12 as the drive source for travel. For example, a first travel mode may be an engine-only travel mode that only uses internal combustion engine 14 as the drive source for travel. A second travel mode may be an EV travel mode that only uses the motor(s) 12 as the drive source for travel. A third travel mode may be an HEV travel mode that uses internal combustion engine 14 and the motor(s) 12 as drive sources for travel. In the engine-only and HEV travel modes, vehicle 10 relies on the motive force generated at least by internal combustion engine 14, and a clutch 15 may be included to engage internal combustion engine 14. In the EV travel mode, vehicle 10 is powered by the motive force generated by motor 12 while internal combustion engine 14 may be stopped and clutch 15 disengaged.

Internal combustion engine 14 can be any type of internal combustion engine, such as a gasoline, diesel or a similarly powered engine in which fuel is injected into and combusted in a combustion chamber. An output control circuit 14A may be provided to control drive (output torque) of internal combustion engine 14. Output control circuit 14A may include a throttle actuator to control an electronic throttle valve that controls fuel injection, an ignition device that controls ignition timing, and the like. Output control circuit 14A may execute output control of internal combustion engine 14 according to a command control signal(s) supplied from an electronic control unit 50, described below. Such output control can include, for example, throttle control, fuel injection control, and ignition timing control.

Motor 12 can also be used to provide motive power in vehicle 10, and is powered electrically via a power storage device 44. Motor 12 can be powered by power storage device 44 to generate a motive force to move the vehicle and adjust vehicle speed. Motor 12 can also function as a generator to generate electrical power such as, for example, when coasting or braking. Power storage device 44 may also be used to power other electrical or electronic systems in the vehicle, such as the electric resistance heaters equipped to EHC 22. Motor 12 may be connected to power storage device 44 via an inverter 42. Power storage device 44 can include, for example, one or more batteries, capacitive storage units, or other storage reservoirs suitable for storing electrical energy that can be used to power one or more motors 12. When power storage device 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motors and adjust the current received from motors 12 during regenerative coasting and breaking. As a more particular example, output torque of the motor 12 can be increased or decreased by electronic control unit 50 through the inverter 42.

A torque converter 16 can be included to control the application of power from internal combustion engine 14 and motors 12 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage internal combustion engine 14 from the drivetrain of the vehicle. In the illustrated example, a crankshaft 32, which is an output member of internal combustion engine 14, may be selectively coupled to the motors 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from internal combustion engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1A, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of ICE 14 (engine RPM), a rotational speed, NMG, of the motor 12 (motor rotational speed), and vehicle speed, NV. These may also include torque converter 16 output, NT (e.g., output amps indicative of motor output), brake operation amount, B, battery SOC (i.e., the charged amount for battery 44 detected by an SOC sensor). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits).

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensor 52 may provide an analog output or a digital output.

Figure 1B:
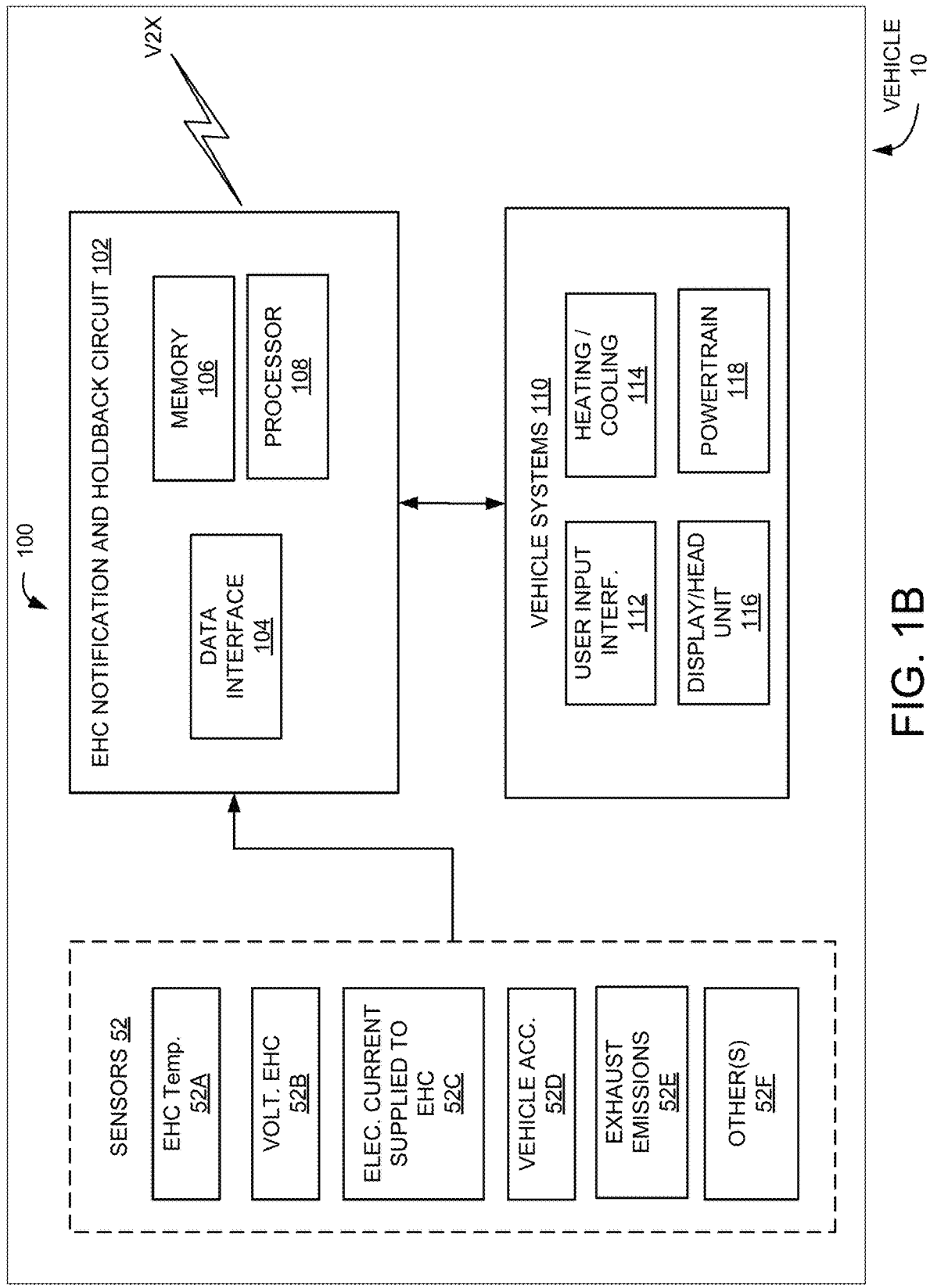
FIG. 1B illustrates an example architecture for an EHC notification and holdback system in the vehicle from FIG. 1A.

FIG. 1B is a diagram illustrating an example of an EHC notification and holdback system in a vehicle that can (1) provide information related to the operation an EHC in the vehicle to a driver of the vehicle; (2) implement a vehicle operation holdback function based on the operation state of the EHC.; and (3) provide a bypass function to the driver to bypass the vehicle operation holdback function.

In this example, vehicle 10 includes an EHC notification and holdback system 100. EHC notification and holdback system 100 includes an EHC notification and holdback circuit 102, a plurality of sensors 52A-F, and a plurality of vehicle systems 110. Sensors 52A-F and vehicle systems 110 can communicate with EHC notification and holdback circuit 102 via a wired or wireless communication interface. Although sensors 52A-F and vehicle systems 110 are depicted as communicating with EHC notification and holdback circuit 102, they can also communicate with each other as well as with other vehicle systems. For example, as will be discussed in greater detail below, user input interface 112 may communicate with powertrain system 118 in order to implement a driver initiated function to bypass a vehicle operation holdback restriction. EHC notification and holdback system 102 can be implemented as a standalone electronic control unit or as part of an electronic control unit such as, for example electronic control unit 50.

EHC notification and holdback circuit 102 in this example includes a data interface 104, a memory 106, and a processor 108. Components of EHC notification and holdback circuit 102 may communicate with each other via a data bus, although other communication in interfaces can be included.

Processor 108 may be a GPU, CPU, microprocessor, or any other suitable processing system. The memory 106 may include one or more various forms of memory or data storage (e.g., flash, RAM, etc.) that may be used to store calibration parameters, images (analysis or historic), point parameters, instructions and variables for processor 108 as well as any other suitable information. As will be discussed in greater detail below, in embodiments of the present disclosure, memory 106 may include threshold value data, for example data associated with a threshold temperature value for EHC 22.

Memory 106 can be made up of one or more modules of one or more different types of memory, and may be configured to store data and other information as well as operational instructions that may be used by the processor 108 to control EHC notification and holdback circuit 102.

Although the example of FIG. 1B is illustrated using processor and memory circuitry, as described below with reference to circuits disclosed herein, EHC notification judgment circuit 102 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up an EHC notification judgment circuit.

Data interface 104 can be either a wireless communications/processing interface or a wired communications/processing interface with an associated hardwired data port (not illustrated). As this example illustrates, communications with EHC notification and holdback circuit 102 can include either or both wired and wireless communications. A wireless data interface can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

A wired data interface can include a transmitter and a receiver (not shown) for hardwired communications with other devices, e.g., a hardwired interface to other components, including sensors 52A-F and vehicle systems 110. A wired data interface can communicate with other devices using Ethernet or any of a number of other wired communication protocols whether standardized, proprietary, open, point-to-point, networked or otherwise.

Data interface 104 can be used to receive and transmit data between EHC notification and holdback circuit 102 and vehicle systems 110. For example, as will be discussed in greater detail below, data interface 104 may transmit control signals to vehicle systems 110 which implement vehicle operation holdback functions. Data interface 104 can also be configured to receive and transmit data between EHC notification and holdback circuit 102 and sensors 52A-F. For example, data interface 104 may receive data related to the temperature of EHC 22 from EHC temperature sensor 52A. Data interface 104 may also receive other information, such as the voltage across EHC 22, or the electric current supplied to EHC 22, from sensors 52B and 52C, respectively. This voltage and electrical current data may be used to determine the electrical power supplied to EHC 22, which in turn can be used to calculate the temperature of EHC 22. In some embodiments, processor 108 may perform these calculations.

Sensors 52A-F may be example embodiments of sensors 52 illustrated in FIG. 1A. Sensors 52A-F can include one or more of the above-mentioned sensors and/or other sensors capable of sensing vehicle operating conditions. It should be understood that not all the illustrated sensors are necessarily needed, and that additional sensors (other sensor(s) 52F) may be used.

EHC notification and holdback circuit 102 may receive the aforementioned sensor or sensor-derived information related to operation of EHC 22, along with information related the operation of vehicle systems 110. As will be discussed in greater detail below, processor 108 may compare this information to threshold value data stored in memory 106, and based on this comparison, determine (1) what information related to the operation of the EHC to provide the driver; and/or (2) what vehicle operation holdback function to implement.

Additionally, from the aforementioned information, EHC notification and holdback circuit 102 can learn how the EHC operates under different vehicle conditions. For example, EHC notification and holdback circuit 102 may learn how the temperature of the EHC changes over time depending on EHC voltage, electric current supplied to the EHC, and operation of vehicle systems 110. In another example, EHC notification and holdback circuit 102 may learn how efficiently the EHC operates at different temperatures based on sensor-derived information related to exhaust emissions and EHC temperature. EHC notification and holdback circuit 102 may store the information related to EHC operation that it learns in memory 106.

In the example illustrated in FIG. 1B, vehicle systems 110 include user input interface 112, heating and cooling system 114, display/head unit 116, and powertrain system 118.

User input interface 112 may include one or more user input interfaces such as buttons, knobs, hard keys, soft keys, voice-controlled input, a touch screen element or aspect of display head unit 116, and the like. User input interface 112 allows a user, such as a driver or passenger of vehicle 10 to interact with one or more of vehicle systems 110. For example, as will be discussed in greater detail below, user input interface 112 may provide a driver with the ability to bypass vehicle operation restrictions, such as accelerations restrictions or restrictions on the heating and cooling system of vehicle 10.

Heating and cooling system 114 may include one or more heating and cooling systems, such as front and rear defrosters, passenger compartment heating and cooling, and seat heaters.

Display/head unit 116 may be used to present audio-visual notifications to the driver. As will be discussed below, in some embodiments, display/head unit 116 may present an indicator light to alert the driver that the EHC has not yet heated to its light-off temperature. In other embodiments, display/head unit 116 may present an audio-visual comparison between the temperature of the EHC and its light-off temperature, which fluctuates based on the driving state of the vehicle. In other embodiments, display/head unit 116 may present an audio-visual notification to the driver which communicates the amount of time it will take the EHC to reach its light-off temperature. In certain embodiments, display/head unit 116 may present a notification to the driver that a vehicle operation hold back function has been implemented (e.g. a restriction on heating and cooling system 114), which the driver may accept or override.

It should be understood that there may be multiple displays in vehicle 10 and the presentation of notifications related to EHC operation may occur on different ones of these displays, e.g., a dashboard, a dashboard display, a heads up display, etc.

Powertrain system 118 may include one or more sources of motive power, such as an internal combustion engine, and in hybrid electric vehicles ("HEVs"), one or more electric motors. As will be discussed in greater detail below, EHC notification and holdback circuit 102 may transmit control signals to powertrain system 118 in order to implement vehicle operation holdback functions, such as for example, an acceleration restriction.

The various aspects of FIG. 1B are provided for illustration purposes only as examples of vehicle components/systems with which embodiments of the disclosed technology may be implemented. One of ordinary skill in the art reading this description will understand that the features/functionality of the disclosed embodiments can be implemented in accordance with other arrangements.

Figure 2:
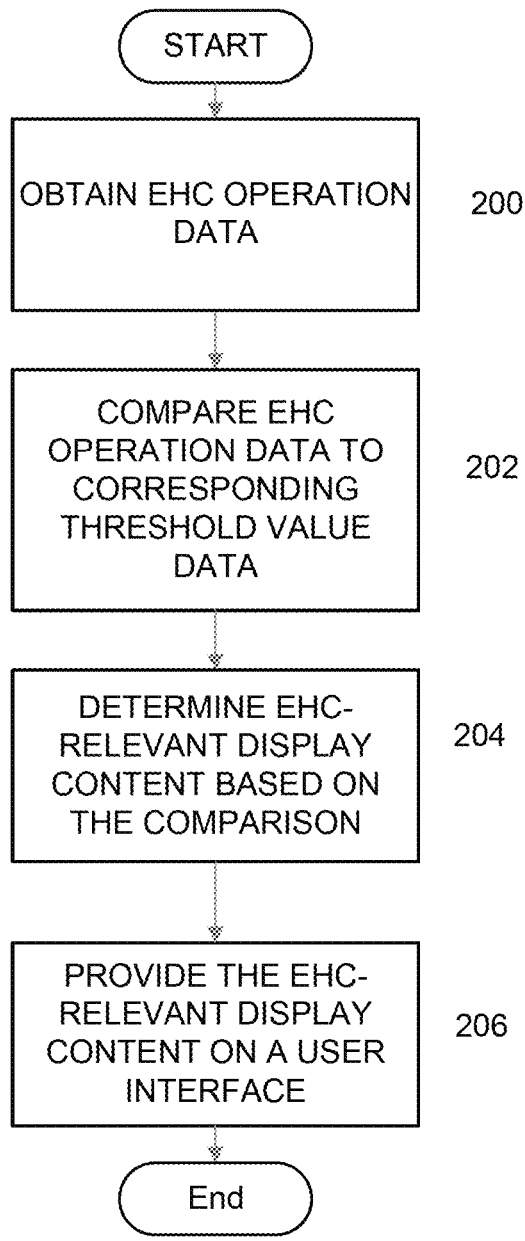
FIG. 2 is a flowchart illustrating example operations that can be performed to notify a driver as to the operation state of an EHC in a vehicle.

FIG. 2 is a flowchart illustrating example operations that can be performed to notify a driver to the operation state of an EHC in a vehicle. At operation 200, EHC operation data is obtained. EHC operation data may be data associated with the current operational state of an EHC in a vehicle, e.g., EHC 22 of vehicle 10. EHC operation data may include information such as temperature of the EHC, electric current supplied to the EHC, voltage across the EHC, and the level of emissions detected both upstream and downstream of the EHC. In some embodiments, data interface 104 may obtain EHC operation data from sensors 52 and vehicle systems 110.

At operation 202, the EHC operation data is compared to corresponding threshold value data. In accordance with various embodiments, individual data types of EHC operation data may be compared to like/corresponding threshold values. For example, the temperature of the EHC may be compared to a threshold EHC temperature. In another example, the level of downstream emissions may be compared to a threshold downstream emissions value. In some embodiments, two or more data types can be compared to verify EHC operational state. For example, both the temperature of the EHC and the level of downstream emissions may be compared with their corresponding threshold values to verify the EHC's current operational state. In another example, the total electric energy supplied to the EHC (which may be calculated by measuring the voltage across the EHC and the current supplied to the EHC over time) may be compared to a corresponding threshold value to verify a temperature comparison, as the temperature of the EHC correlates with the total electric energy supplied to it. In some embodiments, processor 108 may make these comparisons.

In accordance with various embodiments, the threshold value data can be set depending on vehicle characteristics and/or learned environmental conditions in which a vehicle typically operates. For example, as discussed above, EHC notification and holdback circuit 102 may learn how efficiently EHC 22 of vehicle 10 operates at different temperatures, and under different environmental conditions. This learned information may be used to derive a threshold EHC temperature. In some embodiments, this threshold value data may be obtained from memory 106. In certain embodiments, EHC notification and holdback circuit 102 may use V2X communications to obtain threshold value data from the cloud.

At operation 204, EHC-relevant display content is determined based on the comparison between the EHC operation data and the threshold value data. Here, EHC-relevant display content may be the information related to operation of the EHC that is provided to the driver. In some embodiments, it may be determined that information related to operation of the EHC is only provided to the driver when the temperature of the EHC is below a threshold EHC temperature. In other embodiments, it may be determined that the information related to the operation of the EHC provided to the driver varies depending on whether the temperature of the EHC exceeds the threshold EHC temperature. For example, a determination may be made to provide a simple notification to the driver when the temperature of the EHC exceeds the threshold EHC temperature (e.g. a green indicator light), and a more descriptive notification when the temperature of the EHC is less than the threshold EHC temperature (e.g. a bar graph comparison between the temperature of the EHC and the threshold EHC temperature, which fluctuates based on the driving state of the vehicle). In certain embodiments, processor 106 may make these determinations.

At operation 206, the EHC-relevant display content determined in operation 206 is provided on a user interface. In some embodiments, data interface 104 may provide the EHC-relevant display content to display/head unit 116. As discussed above, in some embodiments, display/head unit 116 may present an indicator light to alert the driver that the EHC has not reached the threshold EHC temperature. In other embodiments, display/head unit 116 may present an audio-visual comparison between the temperature of the EHC and the threshold EHC temperature, which fluctuates based on the driving state of the vehicle.

Figure 3:
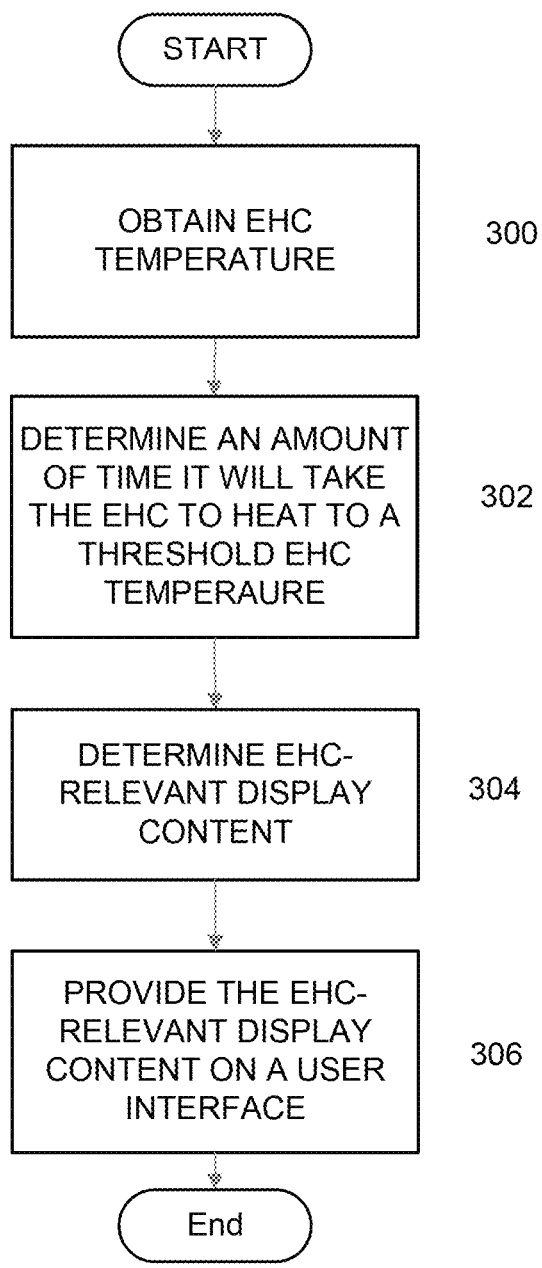
FIG. 3 is another flowchart illustrating example operations than can be performed to notify a driver as to the operation state of an EHC in a vehicle.

FIG. 3 is another flowchart illustrating example operations than can be performed to notify a driver about the operation of an EHC in a vehicle. In some embodiments, these example operations may be performed to notify a driver to the amount of time it will take an EHC to heat to a threshold EHC temperature.

At operation 300, a temperature of an EHC is obtained. In some embodiments, data interface 104 may obtain the temperature of EHC 22 from EHC temperature sensor 52A.

At operation 302, an amount of time it will take the EHC to heat to a threshold EHC temperature is determined. As discussed above, the threshold EHC temperature can be set depending on vehicle characteristics and/or learned environmental/ambient conditions in which vehicle typically operates. In some embodiments, the determination at operation 302 may be made by correlating the temperature of the EHC and its corresponding threshold EHC temperature to known mapping of EHC temperature as a function of time. In certain embodiments, this mapping may be stored in memory 106. In other embodiments, the determination at operation 302 may be made using learned information. As discussed above, EHC notification and holdback circuit 102 may learn how the temperature of the EHC varies over time depending on different variables, for example, EHC voltage, electric current supplied to the EHC, operation of powertrain system 118, and the environmental conditions in which vehicle typically operates. The determination in operation 302 may thus be made by correlating the temperature of the EHC and its corresponding threshold EHC temperature to this learned information. It should be noted that depending on the temperature of the EHC and its corresponding threshold EHC temperature, it may be determined that the amount of time it will take the EHC to heat to the threshold EHC temperature is a zero-value. This will be the case when the EHC temperature obtained in operation 300 is greater than or equal to the threshold EHC temperature.

At operation 304, EHC-relevant display content is determined based on the amount of time it will take the EHC to heat to the threshold EHC temperature. As discussed above, EHC-relevant display content may be the information related to operation of the EHC that is provided to the driver. In some embodiments, it may be determined that information related to the operation of the EHC is only provided to the driver when the amount of time it will take the EHC to heat to the threshold EHC temperature is a non-zero-value. In other embodiments, it may be determined that the information related to the operation of the EHC provided to the driver varies depending on the amount of time it will take the EHC to reach the threshold EHC temperature. For example, a determination may be made to provide a simple notification to the driver when the heating time is a zero-value (e.g. a green indicator light), and a more descriptive notification when the heating time is greater than a zero-value (e.g. a countdown clock representing the time it will take the EHC to heat to the threshold EHC temperature). In certain embodiments, processor 106 may make these determinations.

At operation 306, the EHC-relevant display content determined in operation 304 is provided on a user interface. In some embodiments, data interface 104 may provide the display content to display/head unit 116. As discussed above, in some embodiments, display/head unit 116 may present a countdown clock representing the time it will take the EHC to heat to the threshold EHC temperature.

Figure 4:
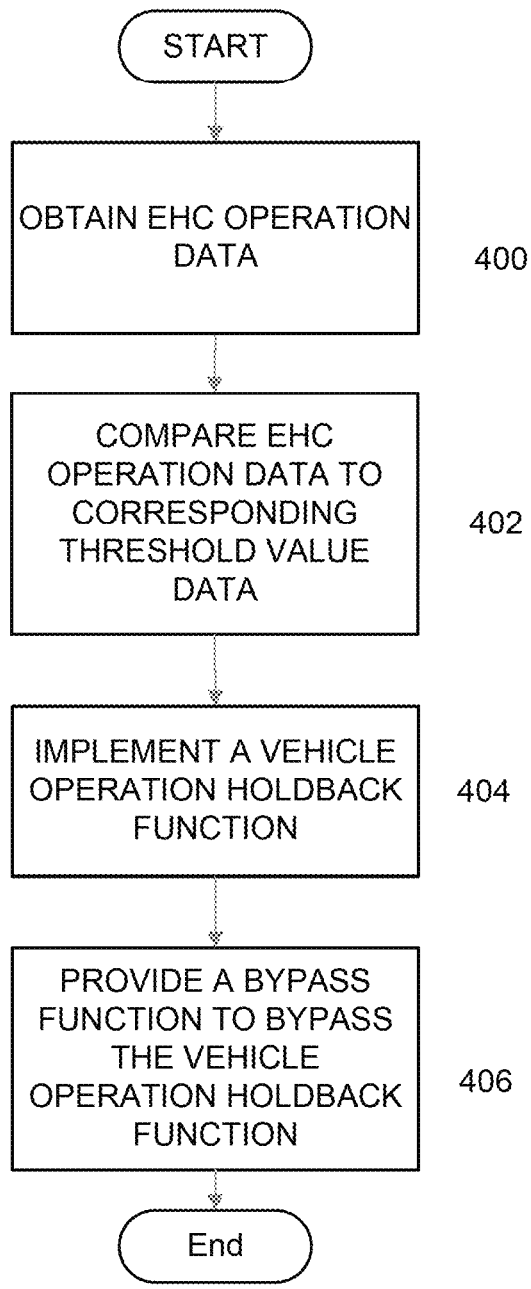
FIG. 4 is a flowchart illustrating example operations than can be performed to implement a vehicle operation holdback function based on the operation state of an EHC in a vehicle, and provide a bypass function to bypass the vehicle operation holdback function.

FIG. 4 is a flowchart illustrating example operations than can be performed to (1) implement a vehicle operation holdback function based on the current operational state of an EHC in a vehicle; and (2) provide a bypass function to bypass the vehicle operation holdback function.

At operation 400, EHC operation data is obtained. Here, EHC operation data may be defined and obtained in the same/similar way as described in conjunction with operation 200 of FIG. 2.

At operation 402, the EHC operation data is compared to corresponding threshold value data. Here, the EHC operation data may be compared to corresponding threshold value data in the same/similar way as described in conjunction with operation 202 of FIG. 2.

At operation 404, a vehicle operation holdback function may be implemented based, in part, on the comparison between the EHC operation data and its corresponding threshold value data. A vehicle operation holdback function may be a control signal that restricts the operation of a vehicle in a way that reduces demand on the power sources of the vehicle (e.g. electric motors, internal combustion engine etc). For example, a vehicle operation holdback function may be an acceleration restriction. Other examples of vehicle operation holdback functions may include dimming the lights of a vehicle, or restricting the operation of the heating and cooling system. In some embodiments, a vehicle operation holdback function may be some combination of the aforementioned examples.

As stated above, a vehicle operation holdback function may be implemented based, in part, on the comparison between the EHC operation data its corresponding threshold value data. In some embodiments, a vehicle operation holdback function may be implemented when one or more thresholds are not met. For example, a vehicle operation holdback function may be implemented when the temperature of the EHC does not meet its corresponding threshold. In another example, the vehicle operation holdback function may be implemented only when both the temperature of the EHC and the level of emissions detected downstream of the EHC do not meet their corresponding thresholds. It should be noted that what constitutes meeting a threshold may vary depending on the individual EHC operation data. For example, a temperature threshold may be met when the temperature of the EHC is greater than or equal to its corresponding threshold value. In another example, an emissions threshold may be met when the level of emissions detected downstream of the EHC is less than its corresponding threshold value.

In some embodiments, the extent of restriction on vehicle operation may vary depending on the comparison between the EHC operation data and the threshold value data. For example, there may be a lesser restriction (e.g. restricting operation of the heating and cooling system) if the temperature of the EHC is slightly less than the threshold EHC temperature, and a more restrictive vehicle operation holdback function if the temperature of the EHC is dramatically less than the threshold EHC temperature (e.g. restricting operation of the heating and cooling system, dimming the lights, and restricting acceleration). In another example, the extent of restriction on vehicle operation may increase when multiple thresholds are not met (e.g. the extent of restriction is higher when both the EHC temperature and emissions thresholds are not met compared to when just the EHC temperature threshold is not met).

In some embodiments, other considerations may be taken into account when determining whether to implement a vehicle operation holdback function. For example, in hybrid vehicles, the difference between the maximum load capacity of the electric motors and the total power demand on the vehicle's power sources may also be taken into account when determining whether to implement a vehicle operation holdback function.

Finally, in certain embodiments EHC notification and holdback circuit 102 may implement the vehicle operation holdback function.

At operation 406, a bypass function is provided to bypass the vehicle operation holdback function. A bypass function may be a driver initiated control signal that bypasses a vehicle operation holdback function. In other words, the bypass function may allow a driver to override a restriction on vehicle operation. For example, if the vehicle operation holdback function restricts operation of the heaters in a vehicle, an initial attempt to actuate/operate the heaters via a heater control or HVAC control interface/knob/switch may be prohibited. For example, an initial "stop" may be effectuated with a switch. To override this initial stop, the user must, e.g., apply more-than-normal force to move the switch past the stop. In some embodiments, a notification may appear on a user interface prompting a driver to confirm or override the restriction before performing the driver-initiated override control/instruction. In another example, if the vehicle operation holdback function restricts acceleration by artificially impeding the travel range of the accelerator pedal, a driver may be allowed to bypass the restriction by applying more pressure than normal on the accelerator pedal. In some embodiments user input interface 112 may provide a bypass function to the driver, which if initiated, may be communicated to vehicle systems 110.

Figure 5:
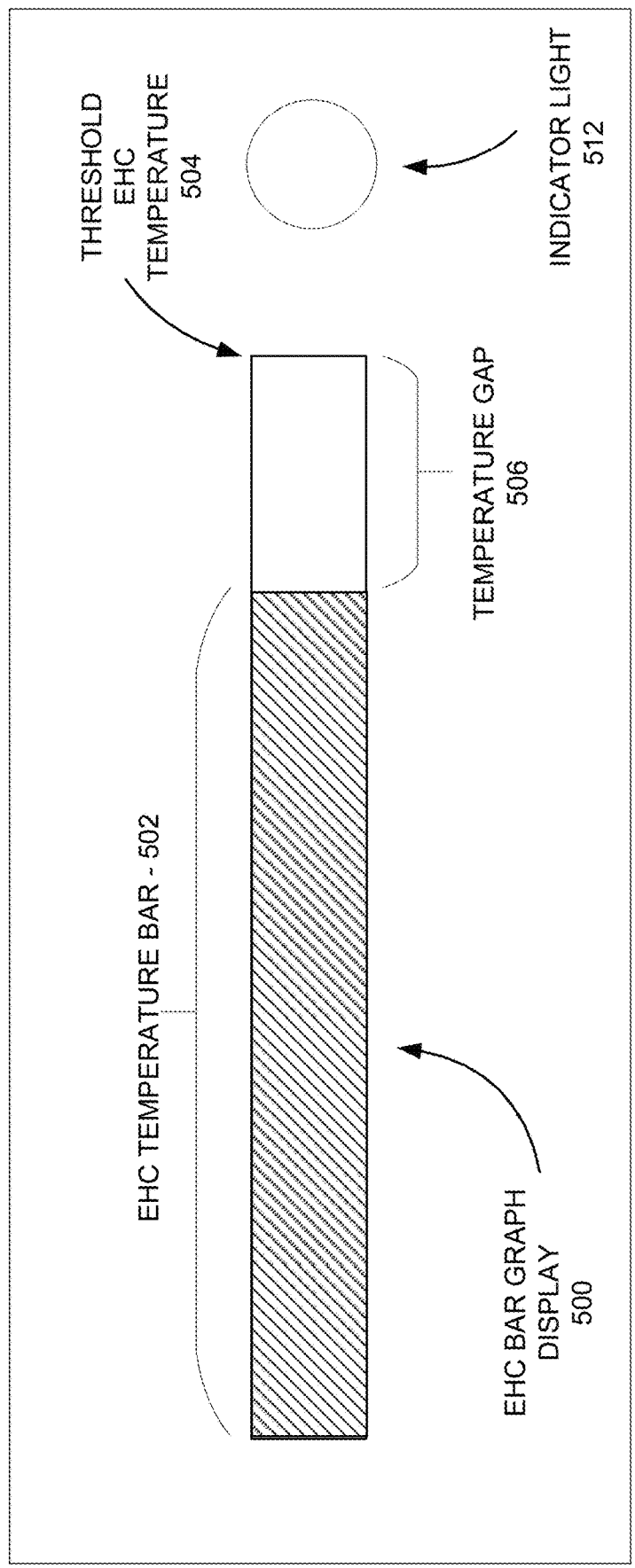
FIG. 5 is a diagram illustrating an example notification related to the operation of an EHC in a vehicle that may be provided to the driver.

FIG. 5 is a diagram illustrating an example of display content. In this embodiment, EHC bar graph display 500 provides a visual comparison between the temperature of the EHC and a threshold EHC temperature. Here, EHC temperature bar 502 represents the temperature of the EHC as it fluctuates based on the driving state of the vehicle. Threshold EHC temperature 504 remains in a static position at the right edge of the bar graph. Temperature gap 506 represents the difference between the EHC temperature and the threshold EHC temperature. Indicator light 508 is a binary display which provides a different color light depending on whether the EHC temperature exceeds the threshold EHC temperature.

In some embodiments, EHC bar graph display 500 may be a pop-up notification that is only provided when the EHC temperature is less than the threshold EHC temperature. In some embodiments, indicator light may be provided at all times.

Figure 6:
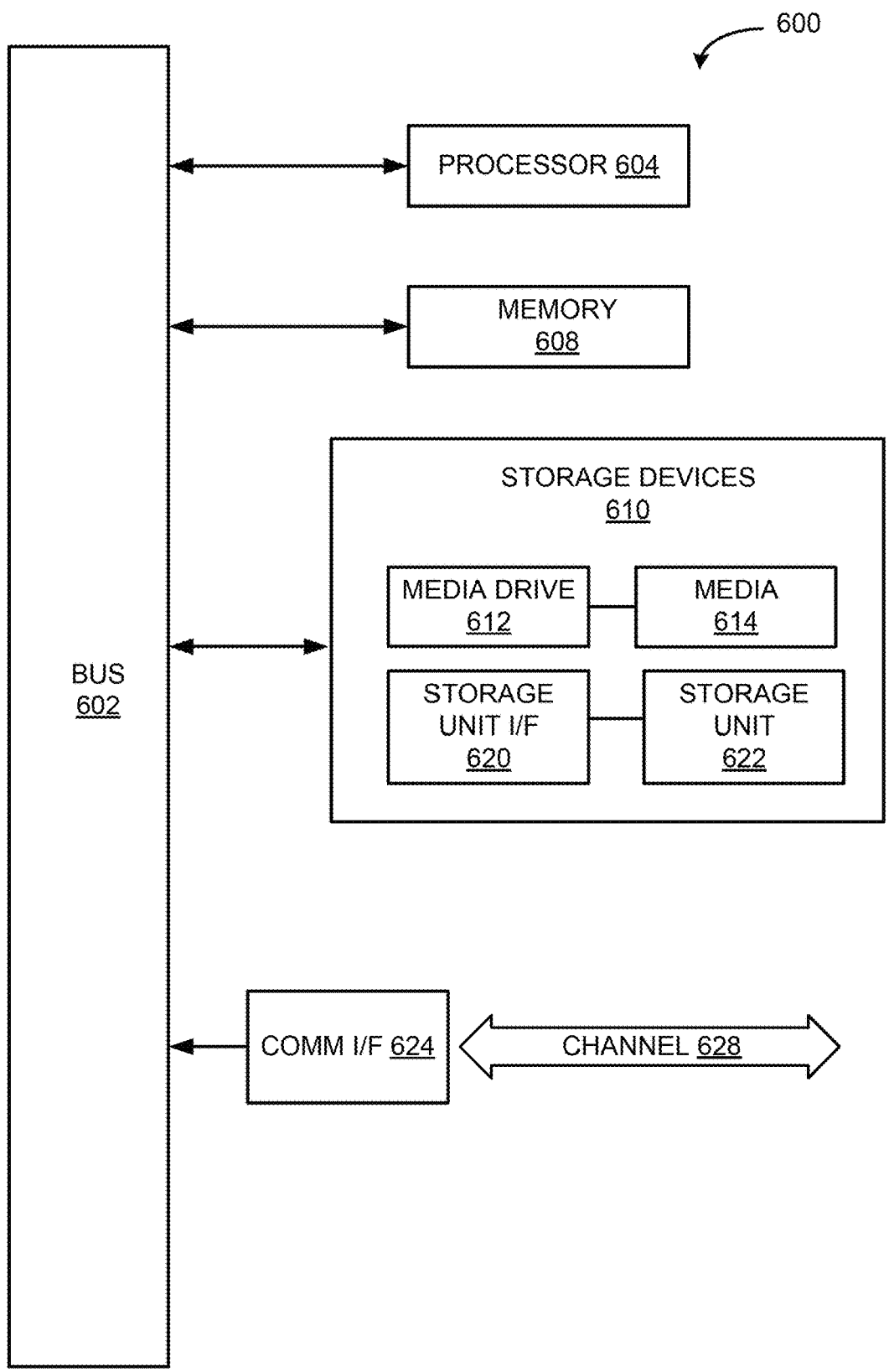
FIG. 6 illustrates an example computing system that may be used in implementing various features of embodiments of the disclosed technology.

Referring now to FIG. 6, computing system 600 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, one or more of the elements or circuits illustrated in FIGS. 1A and 1B and described herein. Computing system 600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 600 might include, for example, one or more processors, controllers, control modules, or other processing devices, such as a processor 604. Processor 604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 604 is connected to a bus 602, although any communication medium can be used to facilitate interaction with other components of computing system 600 or to communicate externally.

Computing system 600 might also include one or more memory modules, simply referred to herein as main memory 608. For example, in some embodiments random access memory (RAM) or other dynamic memory, might be used for storing information and instructions to be executed by processor 604. Main memory 608 might also be used for storing temporary variables or other intermediate information during execution of instructions to be executed by processor 604. Computing system 600 might likewise include a read only memory ("ROM") or other static storage device coupled to bus 602 for storing static information and instructions for processor 604.

The computing system 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), a flash drive, or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing system 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a flash drive and associated slot (for example, a USB drive), a PCMCIA slot and card, and other fixed or removable storage units 622 and interfaces 620 that allow software and data to be transferred from the storage unit 622 to computing system 600.

Computing system 600 might also include a communications interface 624. Communications interface 624 might be used to allow software and data to be transferred between computing system 600 and external devices. Examples of communications interface 624 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 600 to perform features or functions of the disclosed technology as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method comprising:
   comparing data associated with an electrically heated catalyst (EHC) in a vehicle with corresponding threshold value data to determine whether the EHC has exceeded a threshold temperature; and
   upon determining the EHC has not exceeded the threshold temperature, impeding travel range of an accelerator pedal of the vehicle to restrict operation of a running internal combustion engine in the vehicle.

2. The computer implemented method of claim 1, wherein the data associated with the EHC comprises data associated with a current operational state of the EHC.

3. The computer implemented method of claim 1, wherein:
   the data associated with the EHC comprises a temperature of the EHC; and
   the comparison between the data associated with the EHC and the corresponding threshold value data comprises a comparison between the temperature of the EHC and a threshold EHC temperature.

4. The computer implemented method of claim 1, wherein:
   the data associated with the EHC comprises a total electric energy supplied to the EHC; and
   the comparison between the data associated with the EHC and the corresponding threshold value data comprises a comparison between the total electric energy supplied to the EHC and a threshold electric energy.

5. The computer implemented method of claim 1, further comprising providing EHC-relevant display content based on the comparison.

6. The computer implemented method of claim 5, wherein the EHC-relevant display content comprises an audio-visual comparison between a threshold EHC temperature and a temperature of the EHC as it fluctuates based on a driving state of the vehicle.

7. The computer implemented method of claim 5, wherein the EHC-relevant display content comprises an indicator light which indicates whether temperature of the EHC exceeds a threshold EHC temperature.

8. The computer implemented method of claim 7, wherein in the EHC-relevant display content only further comprises an audio-visual comparison between the threshold EHC temperature and the temperature of the EHC as it fluctuates based on a driving state of the vehicle, when the temperature of the EHC is less than the threshold EHC temperature.

9. A computer implemented method comprising:
  determining an amount of time it will take an electrically heated catalyst (EHC) in a vehicle to heat to a corresponding threshold EHC temperature; and
  based on the amount of time it will take the EHC to heat to the corresponding threshold EHC temperature, impeding travel range of an accelerator pedal of the vehicle to restrict operation of a running internal combustion engine in the vehicle.

10. The computer implemented method of claim 9, further comprising:
  providing EHC-relevant display content based on the amount of time it will take the EHC to heat to the corresponding threshold EHC temperature.

11. The computer implemented method of claim 10, wherein the EHC-relevant display content is a countdown clock representing the time it will take the EHC to heat to the threshold EHC temperature.

12. A vehicle comprising:
  an accelerator pedal;
  an electrically heated catalyst (EHC);
  non-transitory memory configured to store instructions; and
  one or processors configured to execute the instructions to cause the vehicle to:
    compare data associated with a current operational state of the EHC with corresponding threshold value data to determine whether the EHC has exceeded a threshold temperature; and
    upon determining the EHC has not exceeded the threshold temperature, impede travel range of the accelerator pedal to restrict operation of a running internal combustion engine in the vehicle.

13. The vehicle of claim 12, wherein the one or processors are further configured to execute the instructions to cause the vehicle to:
  provide a bypass function to bypass the restriction on the operation of the running internal combustion engine.

14. The vehicle of claim 13, wherein the bypass function is a driver initiated control signal.

15. The vehicle of claim 13, wherein the bypass function allows a driver of the vehicle to bypass the restriction on the operation of the running internal combustion engine by applying pressure on the accelerator pedal.

16. The vehicle of claim 12, wherein the one or processors are further configured to execute the instructions to cause the vehicle to:
restrict operation of heaters in the vehicle based on the comparison.

17. The vehicle of claim 12, wherein:
the data associated with the current operational state of the EHC comprises a temperature of the EHC;
the comparison between the data associated with the current operational state of an EHC and its corresponding threshold value data comprises a comparison between the temperature of the EHC and a threshold EHC temperature; and
the restriction on the operation of the running internal combustion engine is implemented when the temperature of the EHC is below the threshold EHC temperature.

18. The vehicle of claim 12, wherein:
the data associated with the current operational state of the EHC comprises a total electric energy supplied to the EHC;
the comparison between the data associated with the current operational state of an EHC and its corresponding threshold value data comprises a comparison between the total electric energy supplied to the EHC and a threshold electric energy; and
the restriction on the operation of the running internal combustion engine is implemented when the total electric energy supplied to the EHC is below the threshold electric energy.

19. The vehicle of claim 12, wherein:
the data associated with the current operational state of the EHC comprises a temperature of the EHC and a level of emissions detected downstream of the EHC;
the comparison between the data associated with the current operational state of the EHC and its corresponding threshold value data comprises a first comparison between the temperature of the EHC and a threshold EHC temperature and a second comparison between the level of emissions detected downstream of the EHC and a threshold emissions level; and
the restriction on the operation of the running internal combustion engine is implemented when:
  the temperature of the EHC is below the threshold EHC temperature, and
  the level of emissions detected downstream of the EHC is above the threshold emissions level.

20. The vehicle of claim 12, wherein:
the data associated with the current operational state of the EHC comprises a temperature of the EHC and a total electric energy supplied to the EHC;
the comparison between the data associated with the current operational state of the EHC and its corresponding threshold value data comprises a first comparison between the temperature of the EHC and a threshold EHC temperature and a second comparison between the total electric energy supplied to the EHC and a threshold electric energy; and
the restriction on the operation of the running internal combustion engine is implemented when:
  the temperature of the EHC is less than the threshold EHC temperature, and
  the total electric energy supplied to the EHC is less than the threshold electric energy.

* * * * *